United States Patent
Cho et al.

(10) Patent No.: US 8,345,622 B2
(45) Date of Patent: Jan. 1, 2013

(54) METHOD FOR TRANSMITTING AND RECEIVING MAP IN WIRELESS MOBILE COMMUNICATION SYSTEM AND SYSTEM THEREFOR

(75) Inventors: Young-Bo Cho, Seongnam-si (KR); Hee-Won Kang, Seongnam-si (KR); Seong-Hyeon Chae, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 783 days.

(21) Appl. No.: 12/487,812

(22) Filed: Jun. 19, 2009

(65) Prior Publication Data

US 2009/0323628 A1 Dec. 31, 2009

(30) Foreign Application Priority Data

Jun. 30, 2008 (KR) .................. 10-2008-0062818

(51) Int. Cl.
*H04W 4/00* (2009.01)
*H04W 72/00* (2009.01)

(52) U.S. Cl. ..................... 370/330; 455/450

(58) Field of Classification Search .................. None
See application file for complete search history.

(56) References Cited

U.S. PATENT DOCUMENTS

2006/0239264 A1* 10/2006 Kang et al. ............... 370/390
2007/0086474 A1* 4/2007 Lee et al. ............... 370/447
2007/0206561 A1* 9/2007 Son et al. ............... 370/346
2008/0031190 A1* 2/2008 Bae et al. ............... 370/329
2009/0252079 A1* 10/2009 Zhang et al. ............ 370/315
2010/0232398 A1* 9/2010 Lim et al. ............... 370/336
2010/0246498 A1* 9/2010 Lim et al. ............... 370/329
2010/0322229 A1* 12/2010 Kim et al. ............... 370/345
2011/0158196 A1* 6/2011 Power et al. ............ 370/329

* cited by examiner

*Primary Examiner* — Eunsook Choi

(74) *Attorney, Agent, or Firm* — Jefferson IP Law, LLP

(57) ABSTRACT

An apparatus and method for transmitting MAP by a base station in a wireless mobile communication system using a frame that includes a plurality of mini frames occupying a specific time period, each of the mini frames including a plurality of Resource Blocks (RBs) occupying a specific frequency band are provided. A number of RBs to be occupied by a data burst to be transmitted is determined. A first variable indicative of a number of mini frames to be occupied by the data burst is determined based on a resource amount corresponding to the number of RBs and an available resource amount of the mini frame. A second variable is determined based on the number of RBs and the first variable. MAP is transmitted that includes the first variable, the second variable, and information indicating RBs where a resource is allocated in a mini frame first located in a time domain among the mini frames to be occupied by the data burst. Each of the RBs where the resource is allocated represents an RB where one of packets segmented from the data burst is allocated.

14 Claims, 11 Drawing Sheets

(CONVENTIOANAL ART)

(CONVENTIOANAL ART)

METHOD FOR TRANSMITTING AND RECEIVING MAP IN WIRELESS MOBILE COMMUNICATION SYSTEM AND SYSTEM THEREFOR

PRIORITY

This application claims the benefit under 35 U.S.C. §119(a) of a Korean patent application filed in the Korean Intellectual Property Office on Jun. 30, 2008 and assigned Serial No. 10-2008-0062818, the entire disclosure of which is hereby incorporated by reference.

BACKGROUND OF THE INVENTION

1. Field of the Invention

The present invention relates to a system and method for transmitting and receiving MAP including resource allocation indication information in a wireless mobile communication system.

2. Description of the Related Art

Wireless mobile communication systems are evolving to provide users with various services such as a broadcasting service, a multimedia image service, and a multimedia message service. In particular, next-generation wireless mobile communication systems are being developed to provide a data service of 100 Mbps or above to users moving at high speed and a data service of 1 Gbps or above to users moving at low speed.

In the next-generation wireless mobile communication systems, a short latency is required to enable a base station and a mobile station to transmit and receive reliable data at high speed. To address this requirement, the next-generation wireless mobile communication systems use mini frames having a shorter period than the frames used in the legacy systems. Advantageously, resource allocation with the use of the mini frames can reduce a delay time of Hybrid Automatic Repeat reQuest (HARQ), and reduce an amount of information used for the resource allocation. Disadvantageously, however, in case of a downlink, the use of the mini frames makes it difficult to allocate a data burst having a size greater than or equal to a specific reference, within one mini frame, and, in case of an uplink, coverage is restricted due to limited power since a mobile station should transmit a data burst in a short time.

To address these shortcomings, a multi-mini frame transmission scheme can be used that transmits a data burst over multiple mini frames. Undesirably, however, the multi-mini frame transmission scheme increases an amount of resource allocation information as it uses a plurality of mini frames. Therefore, the multi-mini frame transmission scheme requires a technique capable of efficiently transmitting a data burst using an amount of resource allocation information that is less than a specific reference.

FIGS. 1 to 4 illustrate conventional resource allocation indication schemes. FIG. 1 illustrates a Start-End scheme, FIG. 2 illustrates a Tree scheme, FIG. 3 illustrates a Triangle scheme, and FIG. 4 illustrates a Bitmap scheme.

Table 1 below respectively shows characteristics and overheads used for resource allocation indication in each of frames having 48 and 348 Resource Blocks (RBs), with regard to the above listed schemes.

TABLE 1

| Characteristic | Start-End Designate a start RB and an end RB. | Tree Can allocate resources only in a size of an exponent of 2. | Triangle Resolve granularity problem of Tree scheme by adding nodes. | Bitmap Indicate allocation of each RB with one information bit. |
|---|---|---|---|---|
| Overhead | $2\lceil \log_2(N) \rceil$ | $\lceil \log_2(N) \rceil + 1$ | $\lceil \log_2(N(N+1)/2 \rceil$ | N |
| Overhead at 48 RBs | 12 bits | 7 bits | 11 bits | 48 bits |
| Overhead at 384 RBs | 18 bits | 10 bits | 17 bits | 384 bits |

In Table 1, N denotes the number of RBs, and $\lceil x \rceil$ is a ceiling function that denotes the least integer greater than 'x'.

When resources are allocated within a single mini frame as described above, a data burst having a size greater than a specific reference should be segmented into a plurality of packets during its transmission. In this case, every segmented packet needs resource allocation information, which unavoidably increases a resource allocation indication overhead. On the other hand, when resources are allocated over multiple mini frames, a resource allocation indication overhead significantly increases as compared with the case where resources are allocated within a single mini frame. Accordingly, there is a need for a system and method for reducing an amount of information used for resource allocation indication in a wireless mobile communication system.

SUMMARY OF THE INVENTION

An aspect of the present invention is to address at least the above-mentioned problems and/or disadvantages and to provide at least the advantages described below. Accordingly, an aspect of the present invention is to provide a system and method for reducing an amount of information used for resource allocation indication in a wireless mobile communication system.

According to an aspect of the present invention, a method for transmitting MAP by a base station in a wireless mobile communication system using a frame that includes a plurality of mini frames occupying a specific time period, each of the mini frames including a plurality of Resource Blocks (RBs) occupying a specific frequency band is provided. The method includes determining a number of RBs to be occupied by a data burst to be transmitted, determining a first variable indicative of a number of mini frames to be occupied by the data burst, based on a resource amount corresponding to the number of RBs and an available resource amount of the mini frame, determining a second variable based on the number of RBs and the first variable and transmitting MAP including the first variable, the second variable, and information indicating RBs where a resource is allocated in a mini frame first located in a time domain among the mini frames to be occupied by the data burst. In an exemplary implementation, each of the RBs where the resource is allocated represents an RB where one of packets segmented from the data burst is allocated.

According to another aspect of the present invention, a method for transmitting MAP by a base station in a wireless mobile communication system using a frame that includes a plurality of mini frames occupying a specific time period, each of the mini frames including a plurality of Resource Blocks (RBs) occupying a specific frequency band is provided. The method includes determining a number of RBs to be occupied by a data burst to be transmitted, determining whether an available resource amount of the mini frame is greater than or equal to a resource amount corresponding to the number of RBs to be occupied by the data burst to be transmitted, transmitting MAP including resource allocation indication information indicating one mini frame for transmitting the data burst, when the available resource amount is greater than or equal to the resource amount corresponding to the number of RBs to be occupied by the data burst to be transmitted, determining a first variable indicative of a number of mini frames to be occupied by the data burst based on the resource amount corresponding to the number of RBs to be occupied by the data burst to be transmitted and the available resource amount of the mini frame, when the available resource amount is less than the resource amount corresponding to the number of RBs to be occupied by the data burst to be transmitted and transmitting MAP including the first variable and information indicating RBs where a resource is allocated in a mini frame first located in a time domain among the mini frames to be occupied by the data burst. In an exemplary embodiment, each of the RBs where the resource is allocated represents an RB where one of packets segmented from the data burst is allocated.

According to further another aspect of the present invention, a method for receiving MAP by a mobile station in a wireless mobile communication system using a frame that includes a plurality of mini frames occupying a specific time period, each of the mini frames including a plurality of Resource Blocks (RBs) occupying a specific frequency band is provided. The method includes receiving and decoding MAP including a first variable indicative of a number of mini frames to be occupied by a data burst, a second variable, and information indicating RBs where a resource is allocated in a mini frame first located in a time domain among mini frames occupied by the data burst received from a base station, acquiring, from the decoded MAP, the first variable, the second variable, and the information indicating RBs where the resource is allocated and decoding the data burst based on the first variable, the second variable, and the information indicating RBs where the resource is allocated. In an exemplary embodiment, each of the RBs where the resource is allocated represents an RB where one of packets segmented from the data burst is allocated.

According to yet another aspect of the present invention, a method for receiving MAP by a mobile station in a wireless mobile communication system using a frame that includes a plurality of mini frames occupying a specific time period, each of the mini frames including a plurality of Resource Blocks (RBs) occupying a specific frequency band is provided. The method includes receiving and decoding MAP that includes information indicating RBs where a resource is allocated in a mini frame first located in a time domain among mini frames occupied by a data burst received from a base station, and a first variable indicative of a number of mini frames to be occupied by the data burst, acquiring, from the decoded MAP, the information indicating RBs where the resource is allocated, and the first variable and decoding the data burst based on the information indicating RBs where the resource is allocated, and the first variable. In an exemplary embodiment, the first variable is determined based on a number of RBs to be occupied by the data burst and an available resource amount of one mini frame when the available resource amount is less than a resource amount corresponding to the number of RBs to be occupied by the data burst, each of the RBs where the resource is allocated represents an RB where one of packets segmented from the data burst is allocated, the first variable is one of natural numbers of 1 to 8, and the frame includes a minimum of 48 RBs and a maximum of 384 RBs.

According to still another aspect of the present invention, a wireless mobile communication system using a frame that includes a plurality of mini frames occupying a specific time period, each of the mini frames including a plurality of Resource Blocks (RBs) occupying a specific frequency band is provided. The wireless mobile communication system includes a base station and a mobile station. The base station determines a number of RBs to be occupied by a data burst to be transmitted, determines a first variable indicative of a number of mini frames to be occupied by the data burst, based on a resource amount corresponding to the number of RBs and an available resource amount of the mini frame, determines a second variable based on the number of RBs and the first variable, and transmits MAP including the first variable, the second variable, and information indicating RBs where a resource is allocated in a mini frame first located in a time domain among the mini frames to be occupied by the data burst, wherein the mobile station receives and decodes MAP including a first variable indicative of a number of mini frames to be occupied by a data burst, a second variable, and information indicating RBs where a resource is allocated in a mini frame first located in a time domain among mini frames occupied by the data burst received from a base station, acquires, from the decoded MAP, the first variable, the second variable, and the information indicating RBs where the resource is allocated and decodes the data burst based on the first variable, the second variable, and the information indicating RBs where the resource is allocated. In an exemplary embodiment, each of the RBs where the resource is allocated represents an RB where one of packets segmented from the data burst is allocated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
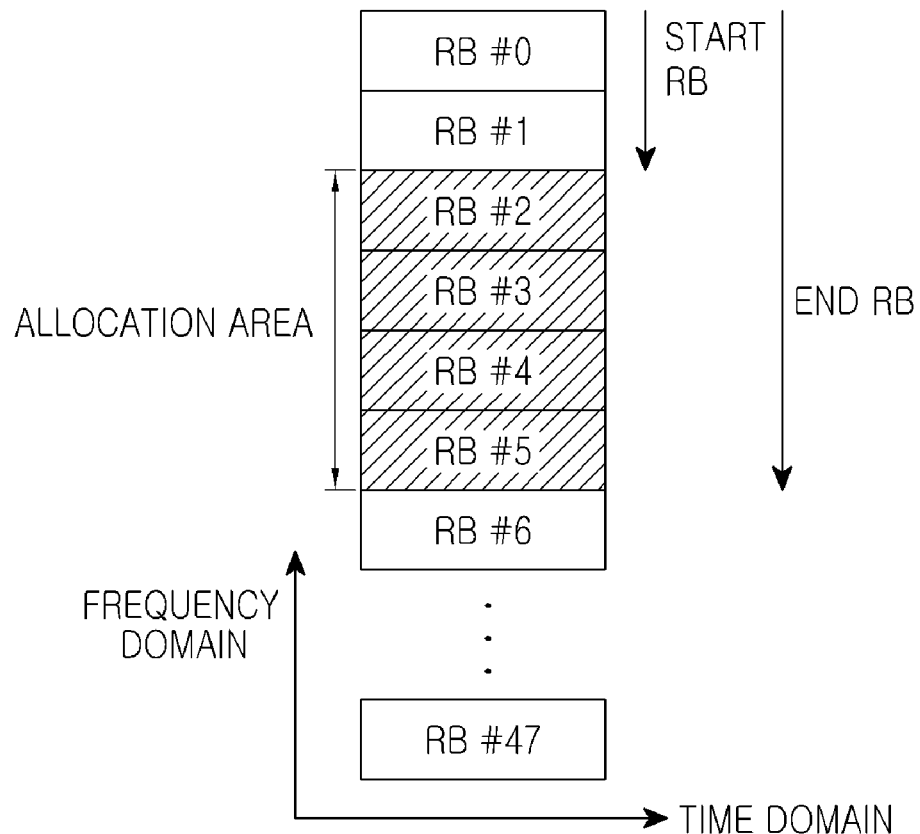
FIG. 1 illustrates a conventional Start-End resource allocation indication scheme.
Figure 2:
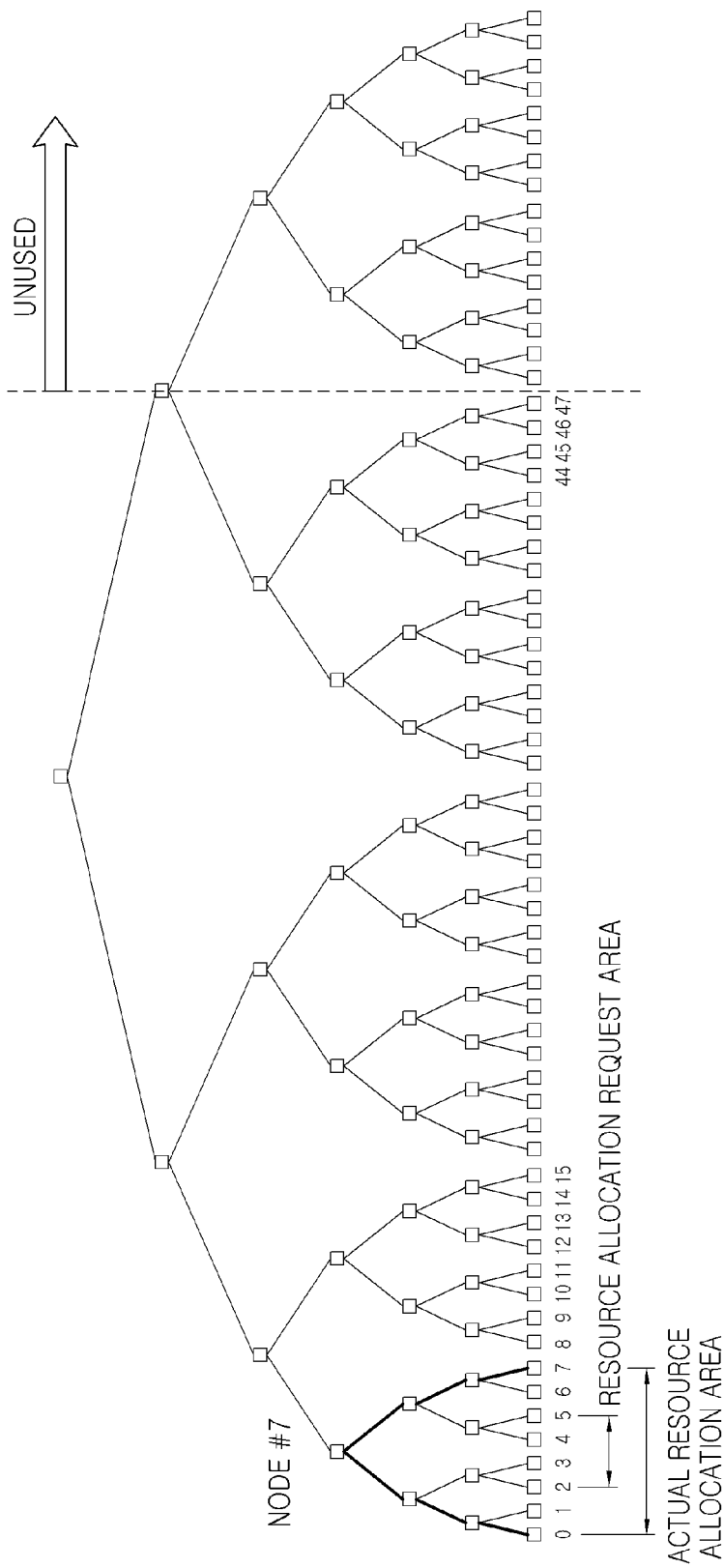
FIG. 2 illustrates a conventional Tree resource allocation indication scheme.
Figure 3:
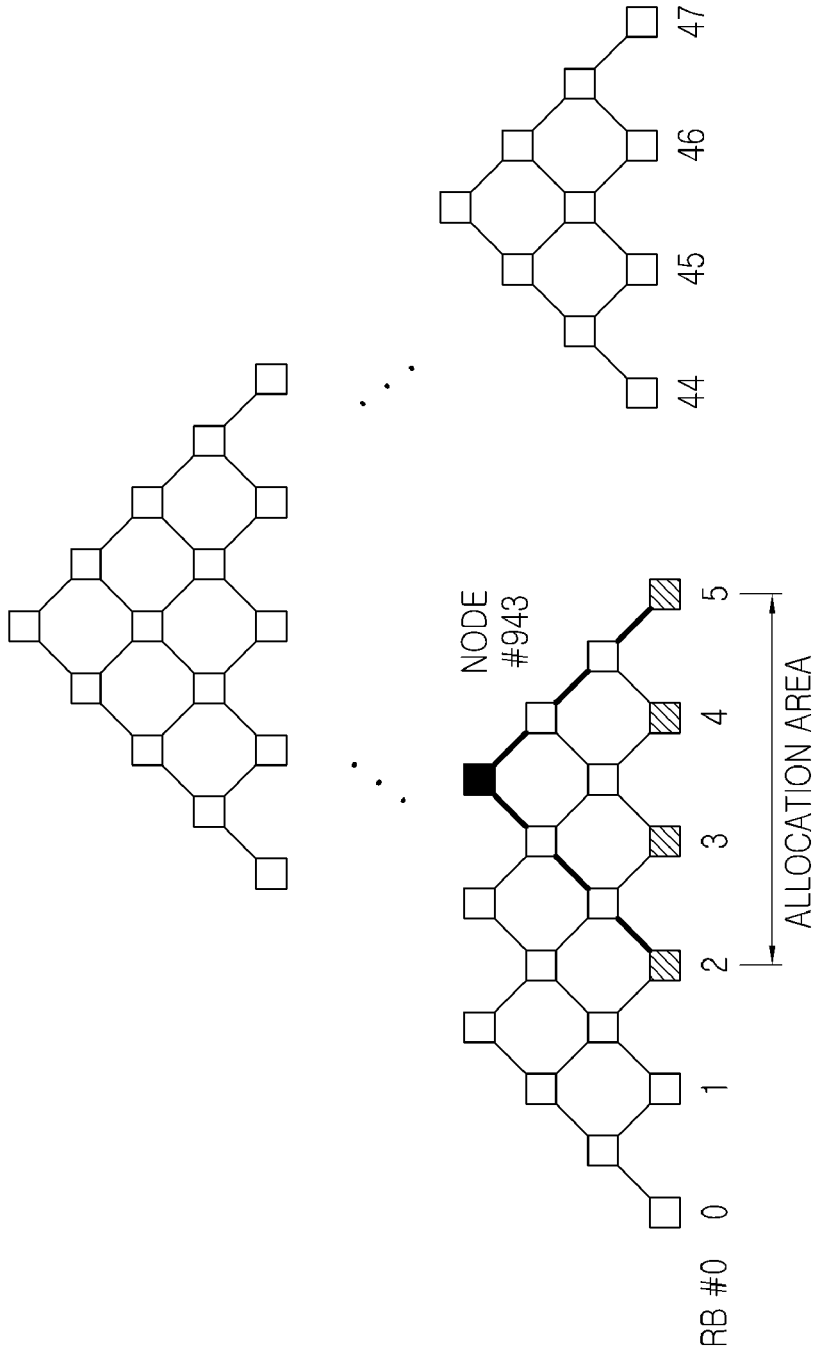
FIG. 3 illustrates a conventional Triangle resource allocation indication scheme.
Figure 4:
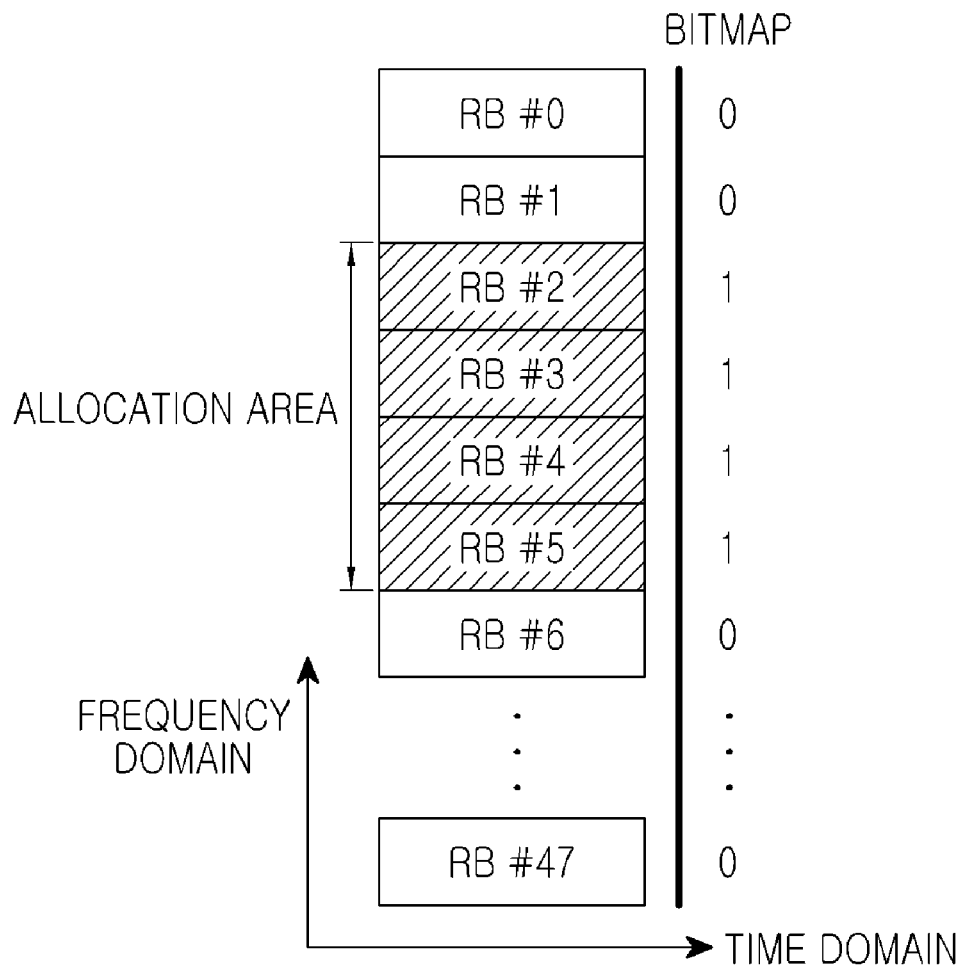
FIG. 4 illustrates a conventional Bitmap resource allocation indication scheme.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a system and method for transmitting information indicating resources allocated for transmission of a data burst when transmitting the data burst over multiple mini frames in a wireless mobile communication system.

Exemplary embodiments of the present invention are preferably applicable to a wireless mobile communication system using an Orthogonal Frequency Division Multiple Access (OFDMA) scheme, such as an Institute of Electrical and Electronics Engineers (IEEE) 802.16m communication system. Resource allocation indication information in the OFDMA wireless mobile communication system and the IEEE 802.16m communication system is included in MAP. However, the present invention is not limited in its application to systems employing an OFDMA scheme. Furthermore, although a method for detecting resource allocation indication information and data bursts will be described herein in connection with transmission/reception of a downlink data burst, embodiments of the present invention can also be applied to transmission/reception of an uplink data burst.

A frame in the IEEE 802.16m communication system may include a maximum of 8 mini frames. Also, 18 subcarriers per mini frame (with 6 OFDM symbols) can constitute one Resource Block (RB). Therefore, one frame may include a minimum of 48 RBs to a maximum of 384 RBs.

Resource allocation indication information according to an exemplary embodiment of the present invention can be can be generated based on all or some of the following considerations.

1. Basically, resource allocation is indicated in one mini frame: If resource allocation is made in one mini frame, the multi-mini frame transmission scheme should be extended from the one-mini frame transmission scheme, and in this case, an overhead generated by the resource allocation indication should not increase significantly.

2. The total number L of mini frames occupied during resource allocation: To transmit a data burst over multiple mini frames, information is needed as to the number of mini frames of one frame through which the data burst is to be transmitted. That is, the information indicating the number of mini frames to be occupied by the data burst is defined as 'L'.

3. The number m of mini frames occupied by packets segmented from the data burst should be considered in the last frequency band among frequency bands occupied by the data burst in a frame.

4. The number of RBs, which increases with a size of the data burst, should be taken into consideration.

Figure 5:
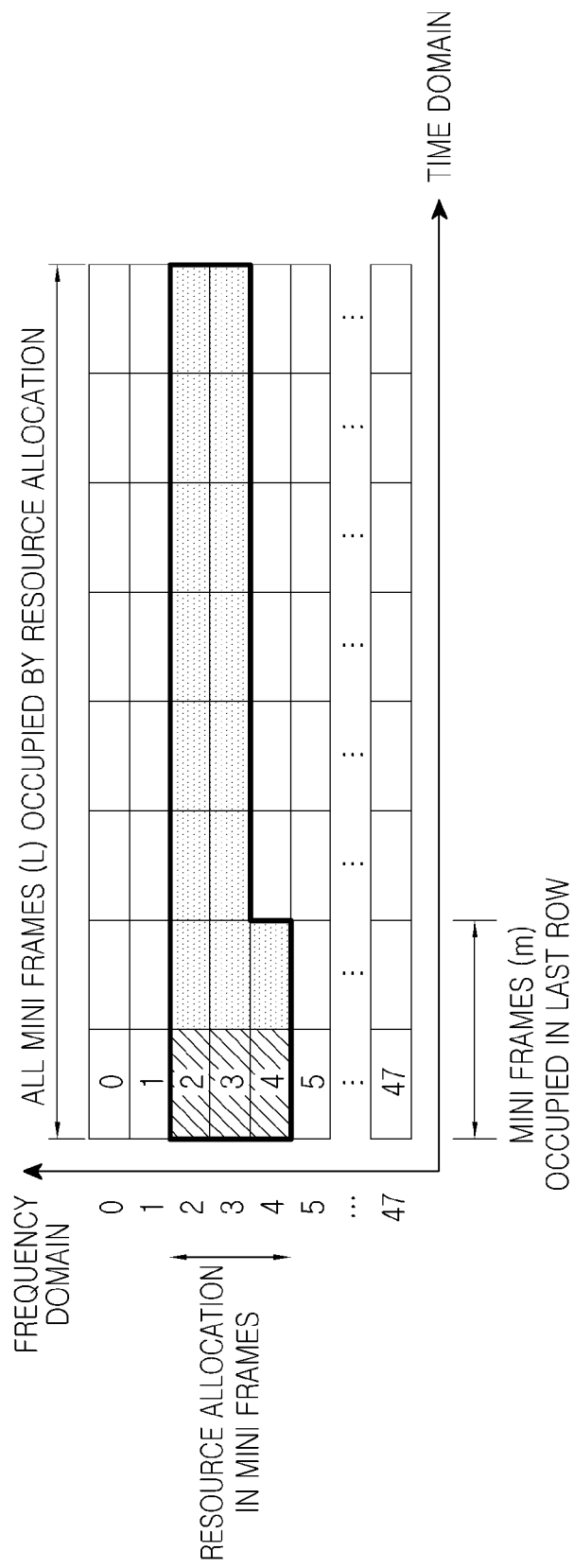
FIG. 5 illustrates a variety of information considered for resource allocation indication according to an exemplary embodiment of the present invention.

FIG. 5 illustrates a variety of information considered for resource allocation indication information according to an exemplary embodiment of the present invention.

Referring to FIG. 5, one frame includes a total of 8 mini frames (i.e. L=8). For transmission of a data burst, a base station allocates RBs located in the second through fourth frequency bands in a frequency domain of the first mini frame among the 8 mini frames, and allocates resources for transmission of the data burst over the total of 8 mini frames (i.e. L=8). The number of mini frames occupying the fourth frequency band is 2 (i.e. m=2). Here, each of the RBs denotes a two-dimensional resource allocation unit in the time-frequency domain.

Figure 6:
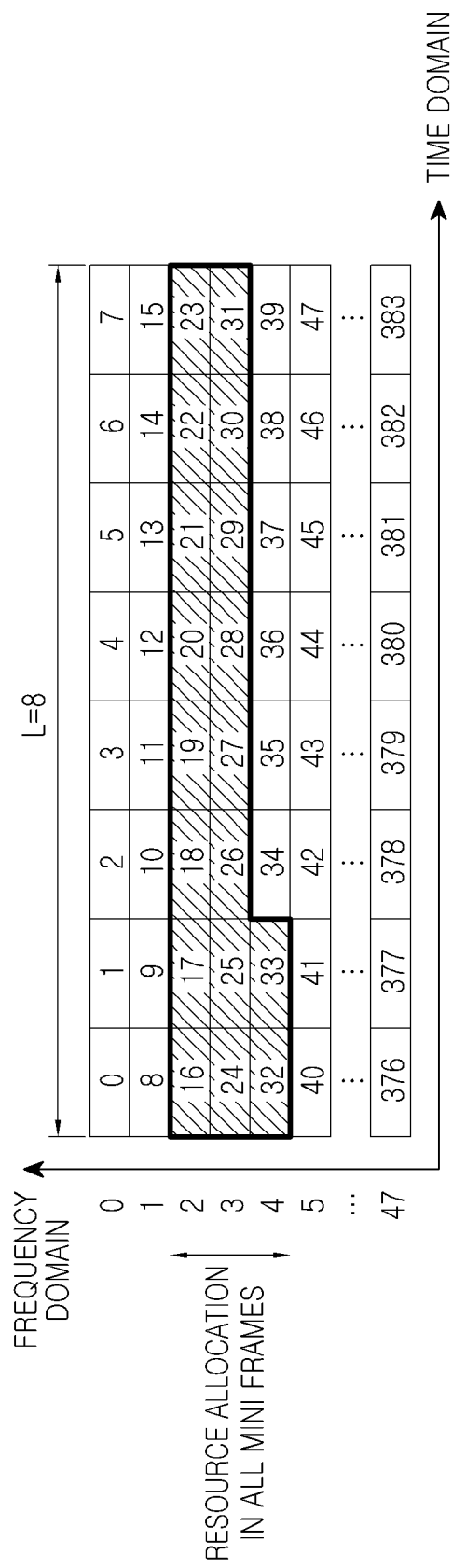
FIG. 6 illustrates resource allocation and a frame structure indicating the same according to a first exemplary embodiment of the present invention.

FIG. 6 illustrates resource allocation and a frame structure indicating the same according to a first exemplary embodiment of the present invention.

Referring to FIG. 6, for transmission of a data burst, a base station transmits resource allocation indication information regarding all mini frames where resources are allocated, to a mobile station. That is, the base station transmits information to the mobile station indicating that an RB #16 through an RB #33 are RBs to be occupied by the data burst. The base station also transmits information indicating that L=8, which is the number of mini frames occupied by the data burst.

The overhead required for resource allocation for the resource allocation indication information according to the first exemplary embodiment can be written as $RI_{total}+Log_2(N_L)$, where $RI_{total}$ denotes an overhead needed to represent all allocated RBs and $N_L$ denotes the total number of cases of L. A more detailed description of $N_L$ will be given below.

Figure 7:
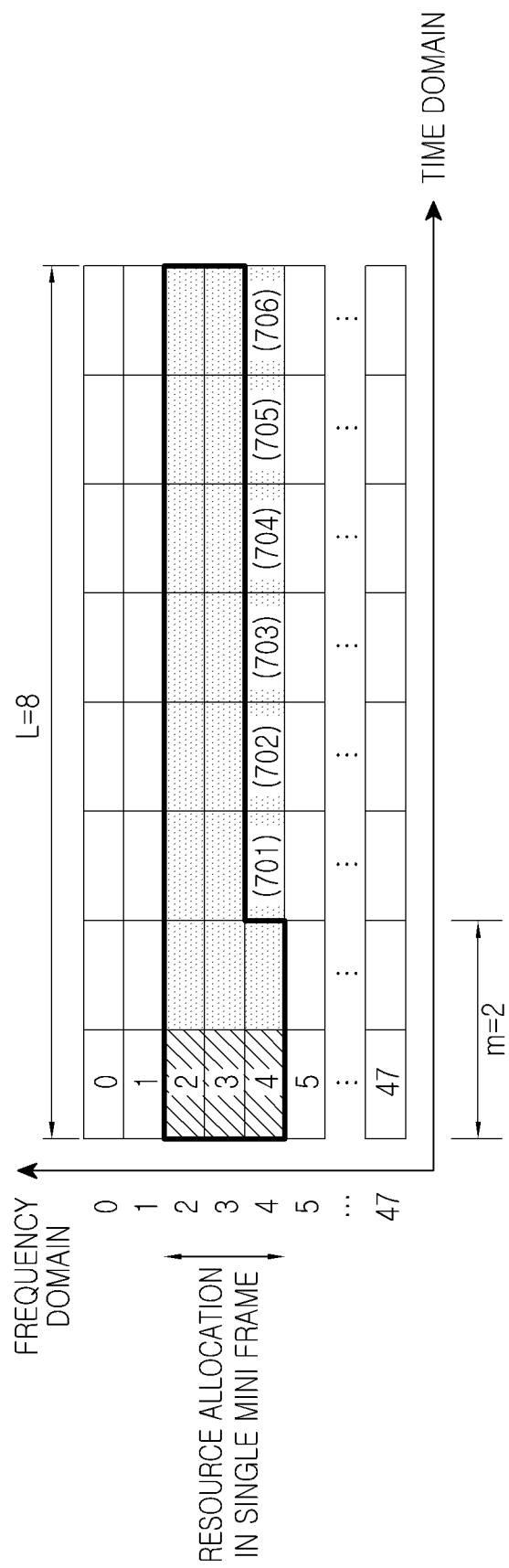
FIG. 7 illustrates resource allocation and a frame structure indicating the same according to a second exemplary embodiment of the present invention.

FIG. 7 illustrates resource allocation and a frame structure indicating the same according to a second exemplary embodiment of the present invention.

Referring to FIG. 7, a base station transmits information to a mobile station indicating RBs to be occupied by packets segmented from a data burst in the first mini frame in a time domain among mini frames occupied by the data burst to be transmitted. The base station also transmits information indicating the number of mini frames to be occupied by the data burst. That is, the base station transmits the information indicating the total number L=8 of mini frames to be occupied by the data burst to the mobile station together with the resource allocation indication information regarding an RB #2 through an RB #4 in the first mini frame.

An overhead required for resource allocation for the resource allocation indication information according to the second exemplary embodiment can be expressed as $RI_{single}+Log_2(N_L)$, where $RI_{single}$ denotes an overhead needed to indicate an RB allocated to a single mini frame. Among overhead required for resource allocation for resource allocation indication information in all exemplary embodiments of the present invention, the overhead required for resource allocation for the resource allocation indication information according to the second exemplary embodiment has the lowest value. However, since resource allocation is indicated only with the RB indication information for a single mini frame and the 'L' value, discarded RBs may undesirably exist. That is, RBs 701 to 706 in FIG. 7 are allocated resources although they are not used for actual transmission of a data burst. Thus, the resource allocation indication information is transmitted unnecessarily.

Figure 8:
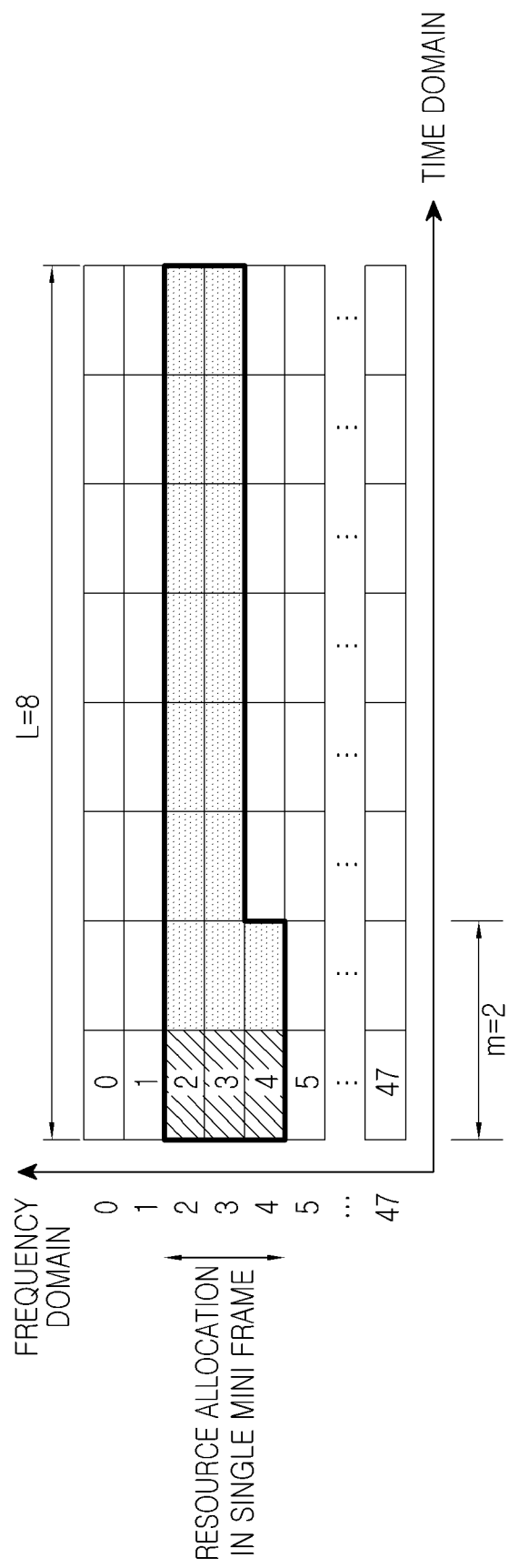
FIG. 8 illustrates resource allocation and a frame structure indicating the same according to a third exemplary embodiment of the present invention.

FIG. 8 illustrates resource allocation and a frame structure indicating the same according to a third exemplary embodiment of the present invention.

Referring to FIG. 8, resource allocation indication information according to the third exemplary embodiment of the present invention is allocated in substantially the same manner as the resource allocation indication information according to the second exemplary embodiment. Distinctively, however, in order not to transmit the information indicating the unused RBs, the base station appoints an 'm' value, or the number of mini frames occupied by packets segmented from a data burst in the last frequency band among the frequency bands occupied by the transmission data burst in a frame. Here, m=2. By transmitting the 'm' value, the base station may not transmit the information indicating the unused RBs.

An overhead required for resource allocation for the resource allocation indication information according to the third exemplary embodiment can be expressed as $RI_{single}+Log_2(N_L)+Log_2(N_m)$, where $N_m$ denotes the total number of cases of m. A more detailed description of $N_m$ will be made below.

Meanwhile, for a frame with 8 mini frames, the 'L' value ranges from 1 to 8. In this case, the total number $N_L$ of cases of L can be 8. However, not all of the 'L' values are needed when a data burst with a size greater than or equal to a specific reference is transmitted over multiple mini frames. That is, when the system presets the 'L' value to one of 1 and 8 (i.e. $N_L=2$), or one of 1, 2 and 8 (i.e. $N_L=3$), a value of $N_L$ in the first to third exemplary embodiments decreases and the total overhead required for resource allocation for resource allocation indication information also decreases.

Table 2 below shows a comparison between overhead required for resource allocation indication information when the $N_L$ value is set to 2, 3 and 8 in the conventional resource allocation indication schemes.

TABLE 2

|  | First exemplary embodiment | | | Second exemplary embodiment | | | Third exemplary embodiment | | |
| --- | --- | --- | --- | --- | --- | --- | --- | --- | --- |
|  | $N_L = 2$ | $N_L = 3$ | $N_L = 8$ | $N_L = 2$ | $N_L = 3$ | $N_L = 8$ | $N_L = 2$ | $N_L = 3$ | $N_L = 8$ |
| Start-End | 19 | 20 | 21 | 13 | 14 | 15 | 14 | 16 | 18 |
| Tree | 11 | 12 | 13 | 8 | 9 | 10 | 9 | 11 | 13 |
| Triangle | 18 | 19 | 20 | 12 | 13 | 14 | 13 | 15 | 17 |
| Bitmap | 385 | 386 | 387 | 49 | 50 | 51 | 50 | 52 | 54 |

As shown in Table 2, in terms of the overhead, the schemes in the second and third exemplary embodiments can be efficiently used for allocating or transmitting the resource allocation indication information. However, in the second exemplary embodiment, the resource allocation indication information for the discarded resources is transmitted undesirably.

As stated above, only some of the values of 1~8 can be used as the 'L' value. For this reason, the 'm' value may also have only some of the values of 1~8. If the 'm' value is limited to only several values, the overhead required for resource allocation for resource allocation indication information in the third exemplary embodiment may decrease.

Therefore, the overhead may decrease remarkably when the 'L' value and the 'm' value are not indicated separately, but are set as one variable. Herein, the one variable will be called '$L_m$'. The $L_m$ can be one of the following cases depending on L and m, and will be defined as $L_m=\{m,L\}$.

a) 2 bits: $L_m=\{1,1\}, \{1,8\}, \{4,8\}, \{8,8\}$
b) 3 bits: $L_m=\{1,1\}, \{1,2\}, \{2,2\}, \{1,8\}, \{2,8\}, \{4,8\}, \{6,8\}, \{8,8\}$
c) 4 bits: $L_m=\{1,1\}, \{1,2\}, \{2,2\}, \{1,4\}, \{2,4\}, \{3,4\}, \{4,4\}, \{1,8\}, \{2,8\}, \{3,8\}, \{4,8\}, \{5,8\}, \{6,8\}, \{7,8\}, \{8,8\}$ For example, if m has values of only 1, 4 and 8 among 1~8, and L has values of only 1 and 8 among 1~8, then L and m can be represented by only 2 bits. If a base station indicates {1,1}, it can be expressed as '00'. If the base station indicates {1,8}, it can be expressed as '01'. If the base station indicates {4,8}, it can be expressed as '10'. If the base station indicates {8,8}, it can be expressed as '1 1'.

Figure 9:
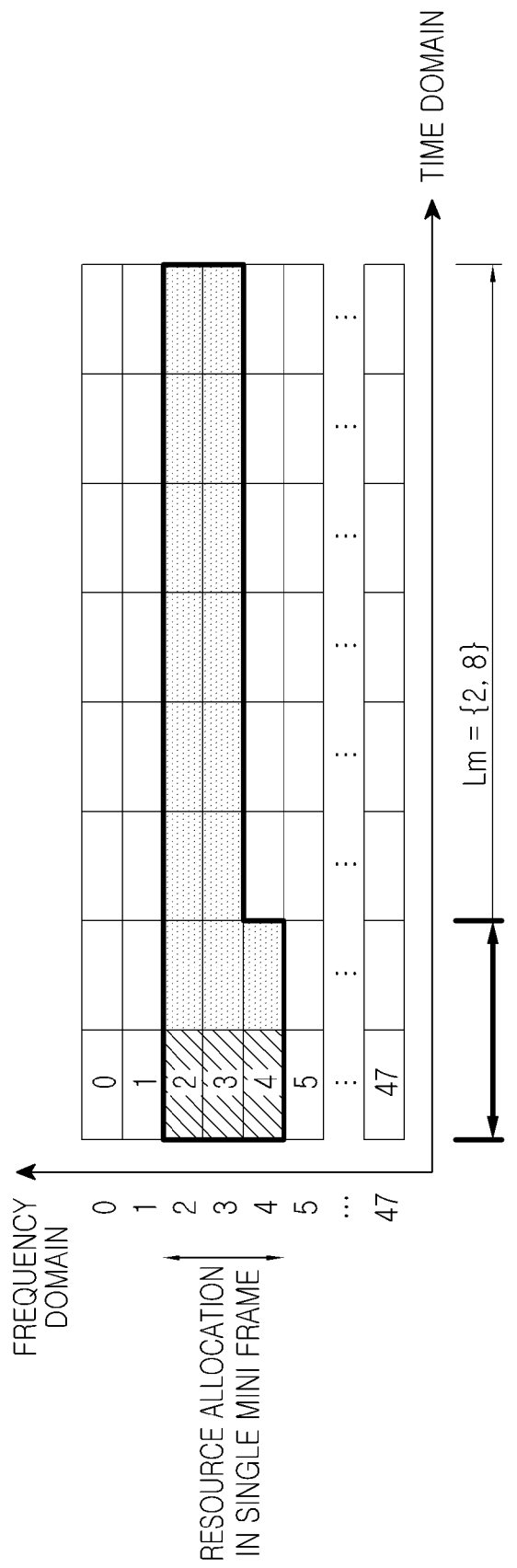
FIG. 9 illustrates resource allocation and a frame structure indicating the same according to a fourth exemplary embodiment of the present invention.

FIG. 9 illustrates resource allocation and a frame structure indicating the same according to a fourth exemplary embodiment of the present invention.

Referring to FIG. 9, resource allocation indication information according to the fourth exemplary embodiment of the present invention is allocated in substantially the same manner as the resource allocation indication information according to the third exemplary embodiment. However, while L and m are indicated separately in the third exemplary embodiment, they are indicated by one variable in the fourth exemplary embodiment, thus contributing to a further reduction in overhead. That is, in FIG. 9, L=8 and m=2 can be expressed as {2,8} in $L_m$, and this can be expressed as '100' or '1000' in bitmap.

Table 3 below shows a comparison between overhead required when the third and fourth exemplary embodiments of the present invention are applied to the conventional resource allocation indication schemes.

TABLE 3

|  | Third exemplary embodiment | | | Fourth exemplary embodiment | | |
|---|---|---|---|---|---|---|
|  | a) | b) | c) | a) | b) | c) |
| Start-End | 15 | 17 | 17 | 14 | 15 | 16 |
| Tree | 10 | 12 | 12 | 9 | 10 | 11 |
| Triangle | 14 | 16 | 16 | 13 | 14 | 15 |
| Bitmap | 51 | 53 | 53 | 50 | 51 | 52 |

Figure 10:
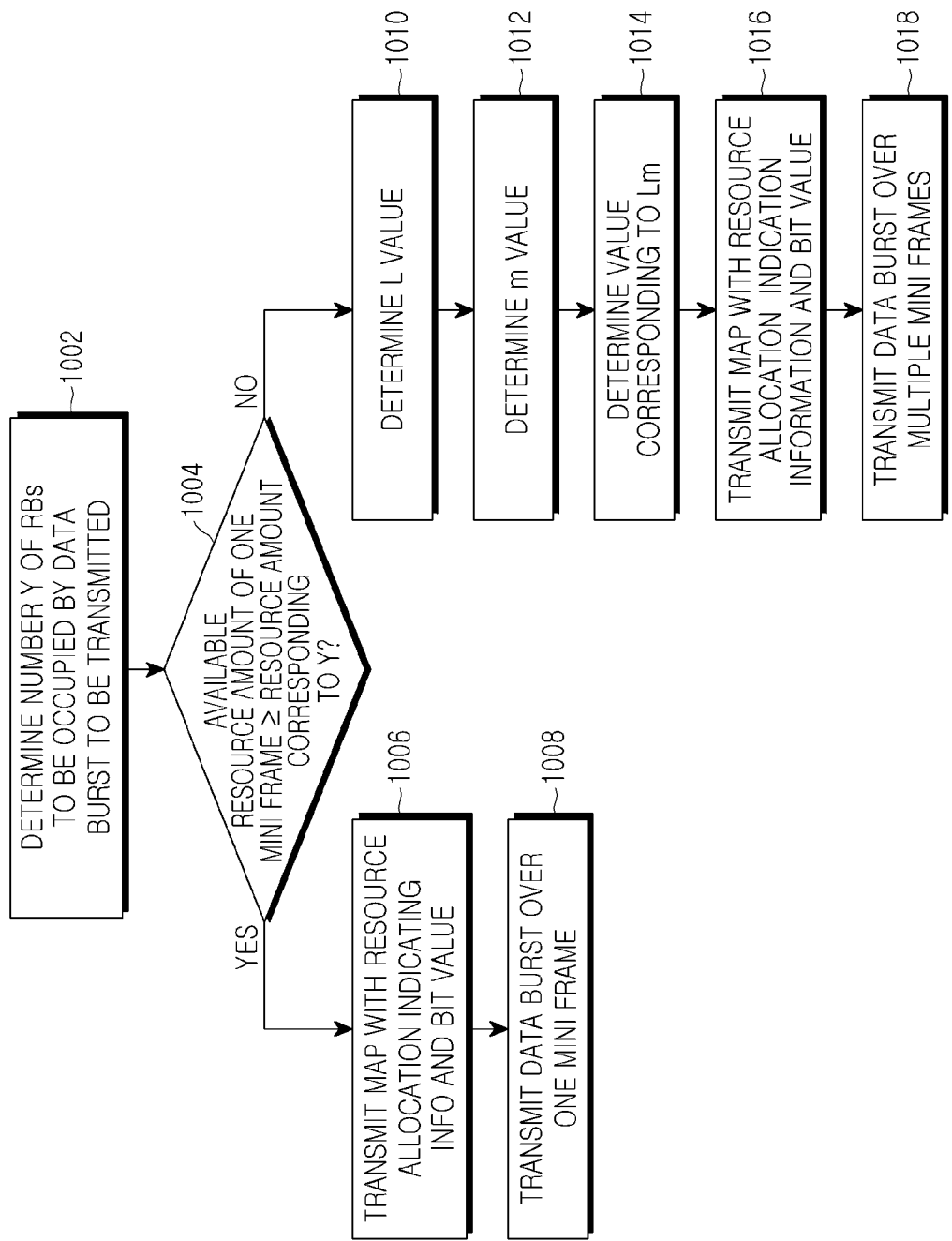
FIG. 10 illustrates a process of transmitting resource allocation indication information and a data burst in a base station according to an exemplary embodiment of the present invention.

FIG. 10 illustrates a process of transmitting resource allocation indication information and a data burst in a base station according to an exemplary embodiment of the present invention.

Referring to FIG. 10, the base station determines the number Y of RBs to be occupied by a desired transmission data burst in step 1002, and determines in step 1004 whether an amount of resources available in one mini frame is greater than or equal to an amount of resources corresponding to the number Y. If the available resource amount is greater than or equal to the resource amount corresponding to the number Y, the base station proceeds to step 1006. If the available resource amount is less than the resource amount corresponding to the number Y, the base station proceeds to step 1010.

In step 1006, the base station transmits MAP that includes resource allocation indication information indicating one mini frame for transmitting the data burst and a bit value corresponding to $L_m=\{1,1\}$. In step 1008, the base station transmits the data burst over the one mini frame.

On the other hand, in step 1010, the base station determines an 'L' value, or the number of mini frames to be occupied by the data burst, taking into account the resource amount corresponding to the number Y and the available resource amount of one mini frame. In step 1012, the base station determines an 'm' value using Equation (1) below:

$$m = L \cdot \text{ceil}(Y/L) - Y \quad (1)$$

where 'ceil' denotes a ceiling function.

In step 1014, the base station determines a bit value associated with a variable $L_m$ corresponding to the determined 'L' and 'm' values. In step 1016, the base station transmits MAP that includes resource allocation indication information in mini frames, the number of which corresponds to the 'L' value, and a bit value corresponding to the '$L_m$' value, for resource allocation indication. In step 1018, the base station transmits the data burst over mini frames corresponding to the 'L' value.

Figure 11:
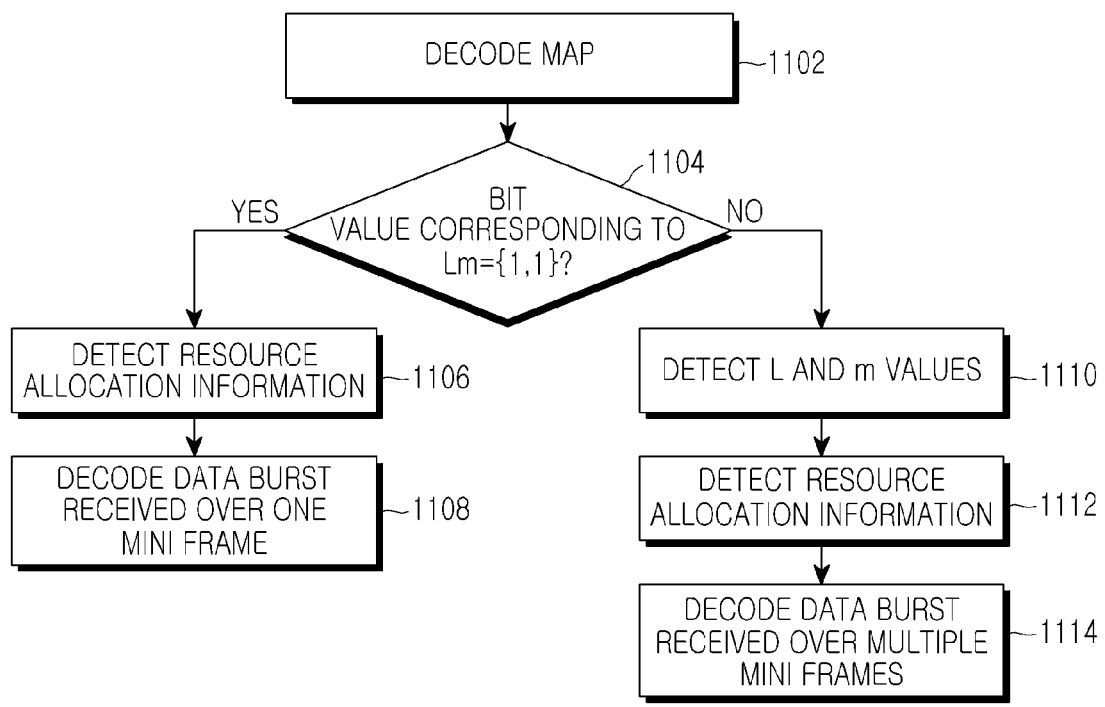
FIG. 11 illustrates a process of decoding a data burst in a mobile station according to an exemplary embodiment of the present invention.

FIG. 11 illustrates a process of decoding a data burst in a mobile station according to an exemplary embodiment of the present invention.

Referring to FIG. 11, the mobile station decodes MAP received from a base station in step 1102, and determines in step 1104 whether a bit value included in the decoded MAP corresponds to $L_m=\{1,1\}$. If the bit value corresponds to $L_m=\{1,1\}$, the mobile station detects resource allocation information included in the MAP in step 1106 and decodes a data burst received over one mini frame in step 1108.

On the other hand, if the bit value does not correspond to $L_m=\{1,1\}$, the mobile station detects 'L' and 'm' values from the bit value in step 1110, and detects resource allocation information included in the MAP in step 1112. In step 1114, the mobile station decodes a data burst received over multiple mini frames corresponding to the 'L' and 'm' values.

As is apparent from the foregoing description, exemplary embodiments of the present invention can efficiently indicate resource allocation with less overhead compared with the conventional resource allocation indication schemes, in transmitting a data burst through multiple mini frames in a wireless mobile communication system.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting MAP by a base station in a wireless mobile communication system using a frame that includes a plurality of mini frames, the method comprising:
    determining a number of Resource Blocks (RBs) to be occupied by a data burst to be transmitted;
    determining a first variable, indicative of a number of mini frames to be occupied by the data burst, based on a resource amount corresponding to the number of RBs and an available resource amount of the mini frame;
    determining a second variable based on the number of RBs and the first variable; and
    transmitting MAP including the first variable, the second variable, and information indicating RBs where a resource is allocated in a mini frame first located in a time domain among the mini frames to be occupied by the data burst,
    wherein each of the RBs where the resource is allocated represents an RB where one of packets segmented from the data burst is allocated, and
    wherein the mini frames occupy a specific time period and each of the mini frames includes a plurality of RBs occupying a specific frequency band.

2. The method of claim 1, wherein the second variable indicates a number of mini frames occupied by the RBs where the resource is allocated in a last one of frequency bands to be occupied by the data burst.

3. The method of claim 1, wherein the determining of the second variable comprises using the equation:

$$m=L\cdot\text{ceil}(Y/L)-Y$$

where m denotes the second variable, L denotes the first variable, Y denotes the number of RBs, and ceil denotes a ceiling function.

4. The method of claim 1, wherein the first variable and the second variable are represented by a third variable including bits each indicating the first variable and the second variable.

5. A method for transmitting MAP by a base station in a wireless mobile communication system using a frame that includes a plurality of mini frames, the method comprising:
  determining a number of Resource Blocks (RBs) to be occupied by a data burst to be transmitted;
  determining whether an available resource amount of the mini frame is greater than or equal to a resource amount corresponding to the number of RBs to be occupied by the data burst to be transmitted;
  transmitting MAP including resource allocation indication information indicating one mini frame for transmitting the data burst, when the available resource amount is greater than or equal to the resource amount corresponding to the number of RBs to be occupied by the data burst to be transmitted;
  determining a first variable indicative of a number of mini frames to be occupied by the data burst based on the resource amount corresponding to the number of RBs to be occupied by the data burst to be transmitted and the available resource amount of the mini frame, when the available resource amount is less than the resource amount corresponding to the number of RBs to be occupied by the data burst to be transmitted; and
  transmitting MAP including the first variable and information indicating RBs where a resource is allocated in a mini frame first located in a time domain among the mini frames to be occupied by the data burst,
  wherein each of the RBs where the resource is allocated represents an RB where one of packets segmented from the data burst is allocated, and
  wherein the mini frames occupy a specific time period and each of the mini frames includes a plurality of RBs occupying a specific frequency band.

6. A method for receiving MAP by a mobile station in a wireless mobile communication system using a frame that includes a plurality of mini frames, the method comprising:
  receiving and decoding MAP including a first variable indicative of a number of mini frames to be occupied by a data burst, a second variable, and information indicating Resource Blocks (RBs) where a resource is allocated in a mini frame first located in a time domain among mini frames occupied by the data burst received from a base station;
  acquiring, from the decoded MAP, the first variable, the second variable, and the information indicating RBs where the resource is allocated; and
  decoding the data burst based on the first variable, the second variable, and the information indicating RBs where the resource is allocated,
  wherein each of the RBs where the resource is allocated represents an RB where one of packets segmented from the data burst is allocated, and
  wherein the mini frames occupy a specific time period and each of the mini frames includes a plurality of RBs occupying a specific frequency band.

7. The method of claim 6, wherein the second variable indicates a number of mini frames occupied by the RBs where the resource is allocated in a last one of frequency bands to be occupied by the data burst.

8. The method of claim 6, further comprising determining the second variable using the equation:

$$m=L\cdot\text{ceil}(Y/L)-Y$$

where m denotes the second variable, L denotes the first variable, Y denotes the number of RBs, and ceil denotes a ceiling function.

9. The method of claim 6, wherein the first variable and the second variable are represented by a third variable including bits each indicating the first variable and the second variable.

10. A method for receiving MAP by a mobile station in a wireless mobile communication system using a frame that includes a plurality of mini frames, the method comprising:
  receiving and decoding MAP that includes information indicating Resource Blocks (RBs) where a resource is allocated in a mini frame first located in a time domain among mini frames occupied by a data burst received from a base station, and a first variable indicative of a number of mini frames to be occupied by the data burst;
  acquiring, from the decoded MAP, the information indicating RBs where the resource is allocated, and the first variable; and
  decoding the data burst based on the information indicating RBs where the resource is allocated, and the first variable,
  wherein the first variable is determined based on a number of RBs to be occupied by the data burst and an available resource amount of one mini frame when the available resource amount is less than a resource amount corresponding to the number of RBs to be occupied by the data burst, each of the RBs where the resource is allocated represents an RB where one of packets segmented from the data burst is allocated, the first variable is one of natural numbers of 1 to 8, and the frame includes a minimum of 48 RBs and a maximum of 384 RBs, and
  wherein the mini frames occupy a specific time period and each of the mini frames includes a plurality of RBs occupying a specific frequency band.

11. A wireless mobile communication system using a frame that includes a plurality of mini frames, the system comprising:
  a base station and a mobile station
  wherein the base station determines a number of Resource Block (RBs) to be occupied by a data burst to be transmitted, determines a first variable indicative of a number of mini frames to be occupied by the data burst, based on a resource amount corresponding to the number of RBs and an available resource amount of the mini frame, determines a second variable based on the number of RBs and the first variable, and transmits MAP including the first variable, the second variable, and information indicating RBs where a resource is allocated in a mini frame first located in a time domain among the mini frames to be occupied by the data burst,
  wherein the mobile station receives and decodes MAP including a first variable indicative of a number of mini frames to be occupied by a data burst, a second variable, and information indicating RBs where a resource is allocated in a mini frame first located in a time domain among mini frames occupied by the data burst received from a base station, acquires, from the decoded MAP, the first variable, the second variable, and the information indicating RBs where the resource is allocated and decodes the data burst based on the first variable, the second variable, and the information indicating RBs where the resource is allocated, and further wherein each of the RBs where the resource is allocated represents an RB where one of packets segmented from the data burst is allocated, and wherein the mini frames occupy a specific time period and each of the mini frames includes a plurality of RBs occupying a specific frequency band.

12. The wireless mobile communication system of claim 11, wherein the second variable indicates a number of mini frames occupied by the RBs where the resource is allocated in a last one of frequency bands to be occupied by the data burst.

13. The wireless mobile communication system of claim 11, wherein the second variable is determined using the equation:

$$m = L \cdot \text{ceil}(Y/L) - Y$$

where m denotes the second variable, L denotes the first variable, Y denotes the number of RBs, and ceil denotes a ceiling function.

14. The wireless mobile communication system of claim 11, wherein the first variable and the second variable are represented by a third variable including at least two bits.

* * * * *